United States Patent
Gopathy et al.

(10) Patent No.: US 12,499,401 B2
(45) Date of Patent: Dec. 16, 2025

(54) METHOD TO DETECT AND PREVENT BUSINESS EMAIL COMPROMISE (BEC) ATTACKS ASSOCIATED WITH NEW EMPLOYEES

(71) Applicant: Cisco Technology, Inc., San Jose, CA (US)

(72) Inventors: Suresh Gopathy, Alpharetta, GA (US); Gajendar Pandey, Delhi (IN)

(73) Assignee: Cisco Technology, Inc., San Jose, CA (US)

( * ) Notice: Subject to any disclaimer, the term of this patent is extended or adjusted under 35 U.S.C. 154(b) by 140 days.

(21) Appl. No.: 18/523,692

(22) Filed: Nov. 29, 2023

(65) Prior Publication Data

US 2025/0173656 A1    May 29, 2025

(51) Int. Cl.
*G06Q 10/0635*    (2023.01)
*H04L 9/40*    (2022.01)

(52) U.S. Cl.
CPC ..... *G06Q 10/0635* (2013.01); *H04L 63/0281* (2013.01); *H04L 63/1416* (2013.01)

(58) Field of Classification Search
CPC ............ G06Q 10/0635; H04L 63/0281; H04L 63/1416; H04L 51/216; H04L 51/212
See application file for complete search history.

(56) References Cited

U.S. PATENT DOCUMENTS

| | | | |
|---|---|---|---|
| 2020/0344251 A1* | 10/2020 | Jeyakumar | H04L 51/212 |
| 2020/0396258 A1* | 12/2020 | Jeyakumar | G06N 20/00 |
| 2021/0240836 A1 | 8/2021 | Hazony et al. | |
| 2022/0030018 A1 | 1/2022 | Jeyakumar et al. | |
| 2022/0230142 A1 | 7/2022 | Batchu et al. | |
| 2023/0039382 A1 | 2/2023 | Xu et al. | |
| 2023/0403247 A1* | 12/2023 | Berry | H04L 51/42 |
| 2024/0289449 A1* | 8/2024 | Xu | G06F 21/554 |

FOREIGN PATENT DOCUMENTS

WO    WO2023102105 A1    6/2023

OTHER PUBLICATIONS

Search Report and Written Opinion for International Application No. PCT/US2024/056725, Dated Feb. 20, 2025, 16 pages.
Cidon et al., "High Precision Detection of Business Email Compromise," USENIX Security Symposium. Aug. 2019.

* cited by examiner

*Primary Examiner* — Mohammad W Reza
(74) *Attorney, Agent, or Firm* — Lee & Hayes, P.C.

(57) ABSTRACT

Techniques for an email-security detection system to analyze incoming emails for Business Email Comprise (BEC) attacks of targeted new email users in an enterprise based on peer models of email recipients in an enterprise and the conversation history of recipients. A method is disclosed that includes analyzing an incoming email and identifying one or more recipients of the incoming email in an enterprise network; analyzing contextual information in the incoming email for the email intent, and associating the email with a target recipient; applying a relational model associated with peers of the target recipient for detecting whether the incoming email is a business email compromise (BEC) attack directed to the target recipient; applying a relationship model of other recipients of the incoming email for detecting whether the BEC attack is associated with the target recipient; and determining, whether the incoming email is a BEC attack.

20 Claims, 6 Drawing Sheets

| 405 | 410 | 415 | 420 |
|---|---|---|---|
| Steps | Details | Relationship | Metadata |
| Step 3-A (S1) | • Employees in the Reporting Hierarchy of the New Employee<br>• Employees who are Peers to the New Employee ~425 | 430 ~ Employees —Many— ◇ —Related to— 1— Sender | Relationship Metadata:<br>• Sender IP ~435<br>• Sender Domain<br>• Sender Email Address<br>• Sender IP Country of Origin<br>• Email Authentication: SPF, DKIM, DMARC, BIMI, ARC Status<br>• Recipient Email Address<br>• Recipient Domain<br>• Connection Info: TLS Enabled, Version, CIPHERS, etc.<br>• Etc., Etc., |
| Step 3-B (S2) | • Other Recipients in the Email Conversation ~440 | 445 ~ Recipients —Many— ◇ —Related to— 1— Sender | |
| Step 3-C (S3) | { • Past Conversation with Similar Intent<br>• Other Recipient Added During the Conversation with Similar Intent in the Past  ~450<br>{ a) Check if Current Intent is Similar to any of the Past Intent. If yes, Validates if recipients in Current Conversation of Similar Intent.<br>b) Check the Relationship of Recipients with Sender  ~455 | 465 ~ Recipients —Many— ◇ —Have— 1— Intent<br>Recipients —Many— ◇ —Related to— 1— Sender | Intent Metadata: ~460<br>• Relationship Metadata (Captured Above) Plus<br>• Intent Classification : Money Transfer, Invoice, etc.<br>• List of Email Address in the Original Email<br>• List of Email Address Added when the Intent is Serviced.<br>• Etc., Etc., |

METHOD TO DETECT AND PREVENT BUSINESS EMAIL COMPROMISE (BEC) ATTACKS ASSOCIATED WITH NEW EMPLOYEES

TECHNICAL FIELD

The present disclosure relates generally to techniques for an email security detection system to detect Business Email Comprise (BEC) attacks.

BACKGROUND

Electronic mail, or "email," continues to be a primary method of exchanging messages between users of electronic devices. Many email service providers have emerged that provide users with a variety of email platforms to facilitate the communication of emails via email servers that accept, forward, deliver, and store messages for the users. Email continues to be a fundamental method of communication between users of electronic devices as email provides users with a cheap, fast, accessible, efficient, and effective way to transmit all kinds of electronic data. Email is well established as a means of day-to-day, private communication for business communications, marketing communications, social communications, educational communications, and many other types of communications.

When new employees join a company because of their newness to a corporate organization, lack of familiarity with systems, and the availability of online corporate employee profiles and organizational structures; the new employees may be particularly vulnerable to sophisticated phishing and cyber-attacks, and as such, are increasingly being targeted. Business Email Compromise (BEC) attacks targeting new employees in organizations are unfortunately quite common. BEC attacks are designed to take advantage of new employees' unfamiliarity with their peer group, processes, and lack of expertise within an organization to trick them into disclosing sensitive information or performing actions that could compromise the security of an organization. In some instances, there is an increasing trend in which new employees are targeted from compromised accounts which may take several months to detect by an organization's internal security. This failure to recognize compromised accounts may occur because existing Business Email Compromise (BEC) detection processes rely heavily on past email conversation history between the sender and recipient which, in the case of a new employee of an organization, is lacking or non-existent and therefore does not or cannot provide an adequate basis because of the insufficient data to derive or ascertain that a trust relationship exists between the an email sender and one or more email recipients.

It is desirable to implement a process and system that detects, prevents, and combats (BEC) attacks associated with employees and in particular with new employees or laterally placed employees from other groups that have enhanced accuracy. It is desirable to enable the use of an email security detection system of more relevant relationship models as a basis of detection. Such models may include a relationship model of peer employees at the same or similar level in an organization with a target recipient, a relationship model of team members composed of different levels in groups in the organization with the target recipient, and a relationship model of reporting hierarchies between different employees in the organization with the target recipient. The various relationship models with a targeted recipient and other models such as a relationship model of other recipients (including the recipient prior to the targeted action) that are discovered in a targeted email may be combined with data from a conversation history of recipients (or other recipients), as well as recipients cited in an original email thread in which the recipients have been added or removed before a similar intent is serviced.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 4 illustrates a diagram of details, relationships, and metadata for the steps of the email security detection system according to some embodiments.

DESCRIPTION OF EXAMPLE EMBODIMENTS

Overview

Figure 1:
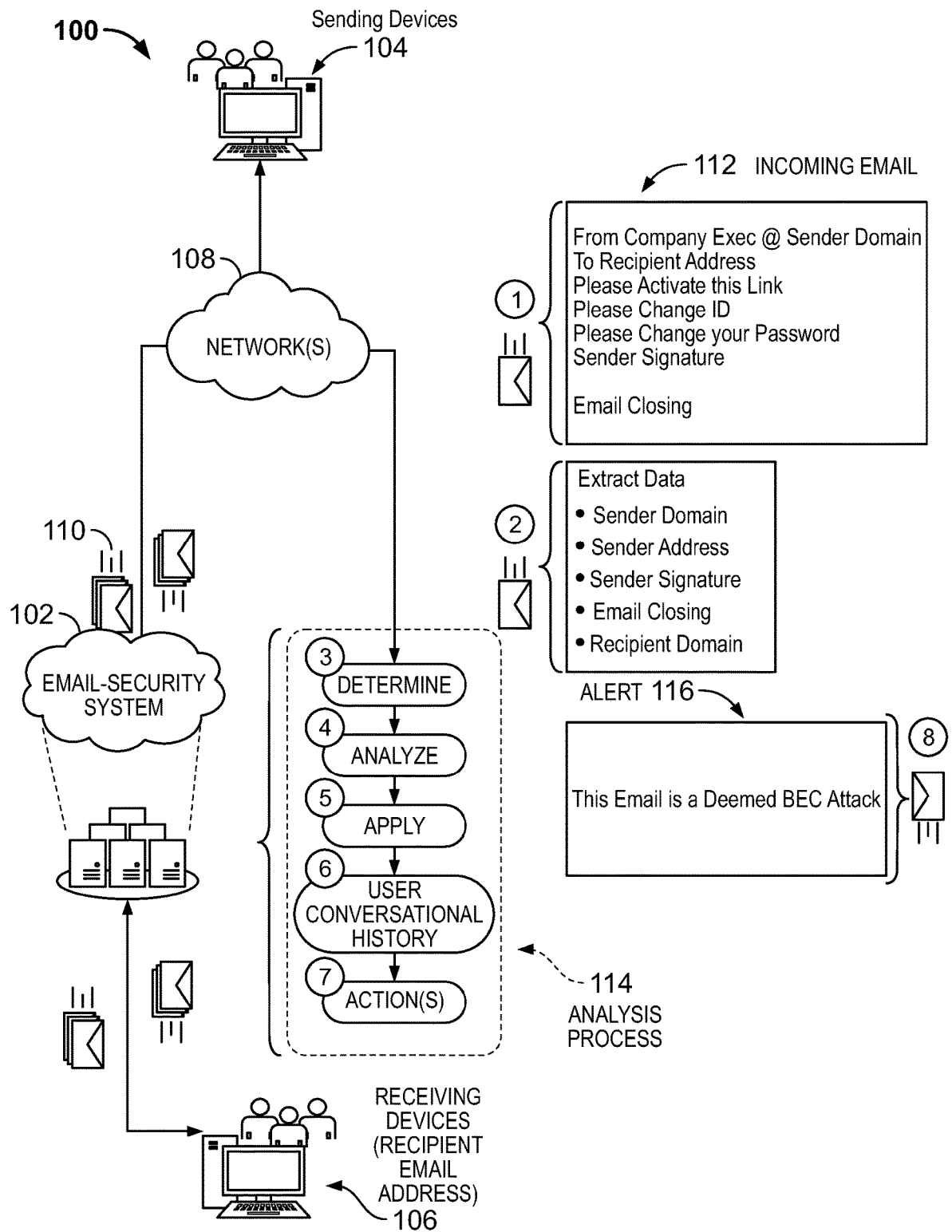
FIG. 1 illustrates a system-architecture diagram of an example email security detection system that determines the intent of an incoming email, analyzes contextual information, applies a relationship model, and uses the conversation history of the email recipient that includes both targeted recipients and other recipients (i.e., recipients that have not been target including past or different sets of recipients) to determine the likelihood of a BEC attack according to some embodiments.

This disclosure describes methods of using a relationship model of a set of peers (Team members, Reporting hierarchy, etc.,) to a targeted recipient and using another relationship model of other email recipients (including peers, team members, reporting hierarchy etc.,) in a targeted email, and using information for a conversation history and set of cited recipients in an original thread added before a similar intent was serviced, to detect a business email compromise (BEC) attack such as a phishing and/or other unauthorized access attempt to solicit information from email recipients. In particular to prevent or combat a BEC attack directed at new email recipients in an organization (i.e., new employees or lateral employees from different entities recently displaced within the organization) where the BEC attack particularly targets one or more vulnerabilities common to new employees or displaced lateral employees of other groups of an organization based on their lack of organizational knowledge and business email practices within the organization or an enterprise network.

In some embodiments, the relationship model that is enabled includes the conversational history of both targeted recipients and recipients that have not been targeted to determine the likelihood of a BEC attack.

This disclosure describes techniques for an email security detection system to detect BEC email attacks such as phishing or other email-based impersonation attacks based in part on determining the intent. For example, to determine if the intent is a malicious, phishing, and/or other business compromise type of intent of an incoming email based in part by using the conversation history between email recipients and/or other recipients cited in the incoming email discovered in an original thread added before a similar intent is being serviced.

In some embodiments, a method is disclosed that includes analyzing an incoming email received at a secure email gateway. The incoming can at least include an external-to-internal routing of an email or an internal-to-internal routing of the email. Then, determining an intent at the secure email gateway associated with one or more emails based on a conversation history associated with the incoming email and by identification of one or more recipients of the incoming email in an enterprise network. Further, analyzing contextual information at the secure email gateway in the incoming email for associating the incoming email with a target recipient of one or more email recipients. Applying at the secure email gateway a relational model associated with one or more peers of a target recipient for detecting whether the incoming email is a business email compromise (BEC) attack directed to the target recipient and another relationship model of other email recipients of the incoming email for detecting whether the BEC attack is associated with the target recipient. Based on a result of the relationship model, determining, at the secure email gateway, whether the incoming email is a BEC attack or not. The target recipient may include at least a new user in the enterprise network, a new employee of an entity associated with an enterprise network, or a lateral employee from a different entity within the enterprise network.

The method further includes requesting information at the secure email gateway of the target recipient in the enterprise network to determine whether a target recipient is at least a new email recipient or a lateral email recipient from other entities of the enterprise network.

The determining is based on the conversation history and the identification of one or more email recipients and includes one or more recipients cited in the conversation history of an original email thread that has been added before a similar intent is being serviced.

The BEC attack includes phishing and unauthorized access attempts to solicit information from employees. The determining of a BEC attack that targets one or more vulnerabilities common to new employees (or not) based on at least one of a lack of organizational knowledge or business email practices of the enterprise network.

Additionally, the techniques described herein may be performed by a system and/or device having non-transitory computer-readable media storing computer-executable instructions that, when executed by one or more processors, performs the method described above.

Example Embodiments

This disclosure describes techniques for an email security detection system using the relationship model of the peers of the targeted recipients; using the relationship model of other recipients in the targeted email; and using the conversation history and cited recipients in the original thread added before a similar intent is being serviced, to detect phishing and unauthorized access attempts to solicit information from new employees that target vulnerabilities common to new employees because of lack of organizational knowledge and business email practices.

In some embodiments, the present invention implements a system and process for detecting and preventing BEC attacks associated with targeted email recipients including in particular new employees (i.e., new email recipients). The process includes an analysis of an incoming email (i.e., external to internal, or internal to internal) that is initiated by scanning the incoming email at an input to a Secure Email Gateway (SEG) of the email security detection system and configuring the SEG (or other parts of the email security detection system) to executes a series of algorithms to determine whether the incoming email constitutes a BEC attack.

In an embodiment, the algorithm may be used in determining an incoming email's intent by intercepting the incoming email at the input of the SEG and using various techniques to detect intent (i.e., malicious/phishing/other business compromise intent) of the email based on analyzing the content of the email body and attachments and by identifying the targeted recipient of the email. For example, identifying if the recipient is a new email recipient of the network such as a new employee of an organization that falls into a group of targeted email recipients.

The identifying process of the new employee may be done in various ways including implementing the SEG to request information from an Active Directory (AD) of employees or by receiving input from an administrator accessing a product User Interface (UI) about the recipient. If one or more of the recipients of the email are identified as new employees, a BEC detection model may be applied to one or more algorithms. In some embodiments, the BEC detection model may consist of a multi-part model built using a relationship model of peers (e.g., team members, reporting hierarchy, etc.,) of the targeted recipient, where the SEG retrieves data from the AD/directory service email address of all the team members with their relationship with each other and with the sender or originator of the incoming email.

In some embodiments, the SEG or email security detection system is configured with an algorithm that applies a weighting factor or scoring to the recipients or employees with certain relationships being weighed or scored with a higher likelihood of being targeted in phishing or other BEC email attacks. Other factors that may also be assessed by such weighting or scoring process can include whether the email recipient had more, is having more or less communications or exchanges in the network in email communications or threads. In some embodiments, the multi-part model may implement a relationship model of other recipients in the targeted email, where the SEG or email security detection system retrieves the email addresses of all the other recipients in the email that is being analyzed and retrieves or determines their relationship to the sender. The other email addresses may also be compared with a repository that is built in real-time of email addresses of senders used in phishing emails using conversation history (i.e., email metadata of past conversations) and recipients in the original thread that are added or removed before a similar intent was serviced, where generating a final score/weight/judgment for the email being analyzed is done using a correlation model based on the data retrieved. Further, the judgment generated by the algorithm is mapped against a policy for taking final actions for the email such as an alert, blocking of the email, or release of the email.

In some embodiments, the email security detection system may monitor emails communicated between users of email platforms, email domains, corporate or internal email systems, or services to detect scam emails, phishing emails, and/or other malicious emails. The email security system may screen emails for monitoring and extracting information for analysis. The email security system may extract in the scanning process of the incoming email meaningful metadata from incoming emails to determine whether the emails are scam emails or otherwise malicious. Meaningful metadata may include information from SMTP commands, Headers, and body of the email, for example, 'mail from', 'rcpt to', 'envelope from', "From" addresses (i.e., sender addresses), sender domain, displayed text, sender signature, brand names for the email, "URL" addresses contained within the email, "Reply-To Field" addresses and/or brand names of the email, a Date/Time the email was communicated, attachments and/or hashes of attachments to the email, URLs in the body of the email and/or associated with unsubscribe actions, and so forth. In some instances, the metadata may additionally include content included in the body of the email, actual attachments to the email, and/or other data of the email that may be private or confidential. Further, the metadata extracted from the email may generally be any probative information for the email security platform to determine whether an email is potentially compromised, suspicious, malicious, or authentic.

In some embodiments, initially, when an email arrives at the input of the SEG, the email security detection system may be configured to extract relevant attributes for analysis and further modeling. Some attributes, such as sender address, sender domain, or display text, are straightforward to extract. Others, such as the sender signature or email closing, can be extracted from email content using natural language processing.

While the systems and techniques described herein are applicable to BEC attacks for new employees of an organization, it is contemplated that their applicability is broad-reaching and can be generally applicable to the detection of any type of malicious, impersonation email, and fraudulent emails (often BEC attacks) that pose prominent threats for detection and mitigation according to the techniques described herein.

In some embodiments, BEC attacks may include BEC fraudulent emails of various types or classes, such as wire-transfer scams, gift card scams, payroll scams, invoice scams, acquisition scams, aging report scams, phone scams, a W-2 scam class, an aging report scam class, a merger and acquisition scam class, an executive forgery scam class, an attorney scam class, a tax client scam, an initial lure or rapport scam class, and so forth. In some instances, fraudulent attacks result in an organization or person under attack losing money or other financial resources. Additionally, the organization or person under attack may lose valuable information, such as trade secrets or other information. These types of fraud are often multi-stage attacks.

In some embodiments, initially, an attacker may instigate a BEC attack by sending a fake or fraudulent email to the victim who may be or is a manager or employee in the organization. This fake or fraudulent email may impersonate a real person who is also a legitimate employee of an organization to build a rapport and an official tone to the message. The fake or fraudulent email may accordingly impersonate a brand and the email itself may be of a sophisticated construction including real domains and/or hyperlinks directed to the actual brand in an attempt to legitimize the email while requesting an action directed to a fraudulent domain and/or hyperlink. Once the victim succumbs to the fraud and follows the instructions found in the fake or fraudulent email, the victim then transfers money to the attacker, either in the form of a transfer to a bank account or sending gift card credentials to an email address.

In some embodiments, the term "enterprise" or "brand" as used and alluded to herein may be interchangeable with the term "organization," "legitimate business," and the like. Enterprise or Brand may also mean a "collaboration," "government," "agencies," "corporate entity," "any type of organization of people," an "entity representative of some grouping of people," etc. Furthermore, a brand or enterprise may also represent an intangible marketing and/or business concept that helps individuals identify the legitimacy of the brand, enterprise, company, individual, collaboration, and the like by which the brand is associated.

Some of the techniques described herein are with reference to fake or fraudulent emails. However, the techniques mentioned are generally applicable to any type of malicious email used in a BEC attack. As described herein, the term "malicious" may be applied to data, actions, attackers, entities, emails, etc., and the term "malicious" may generally correspond to spam, phishing, spoofing, malware, viruses, and/or any other type of data, entities, or actions that may be considered or viewed as unwanted, negative, harmful, etc., for a recipient and/or destination email address associated with email communication.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates a system-architecture diagram 100 of an example email security detection system 102 that determines the intent of an incoming email, analyzes contextual information, applies a relationship model, and uses the conversation history of the email recipient that includes both targeted recipients and other recipients (i.e., recipients that have not been target including past or different sets of recipients) to determine the likelihood of a BEC attack.

In some instances, the email security detection system 102 may be a scalable service that includes and/or runs on devices housed or located in one or more data centers, which may be located at different physical locations. In some examples, the email security detection system 102 may be included in an email platform and/or associated with a secure email gateway platform. The email security detection system 102 and the email platform may be supported by networks of devices in a public cloud computing platform, a private/enterprise computing platform, and/or any combination thereof. One or more data centers may be physical facilities or buildings located across geographic areas that are designated to store networked devices that are part of and/or support the email security detection system 102. The data centers may include various networking devices, as well as redundant or backup components and infrastructure for power supply, data communications connections, environmental controls, and various security devices. In some examples, the data centers may include one or more virtual data centers which are a pool or collection of cloud infrastructure resources specifically designed for enterprise needs, and/or for cloud-based service provider needs. Generally, the data centers (physical and/or virtual) may provide basic resources such as processor (CPU), memory (RAM), storage (disk), and networking (bandwidth).

The email security detection system 102 may be associated with an email service platform and may generally comprise any type of email service provided by any provider, including public email service providers (e.g., GOOGLE® Gmail, MICROSOFT® Outlook, YAHOO!® Mail, AOL mail, APPLE® mail, PROTON® mail, etc.), as well as private email service platforms maintained and/or operated by a private entity or enterprise. Further, the email service platform may comprise cloud-based email service platforms (e.g., GOOGLE® G Suite, MICROSOFT® Office 365, etc.) that host email services. However, the email service platform may generally comprise any type of platform for managing the communication of email communications between clients or users. The email service platform may generally comprise a delivery engine behind email communications and include the requisite software and hardware for delivering email communications between users. For instance, an entity may operate and maintain the software and/or hardware of the email service platform to allow users to send and receive emails, store and review emails in inboxes, manage and segment contact lists, build email templates, manage and modify inboxes and folders, scheduling, and/or any other operations performed using email service platforms.

The email security detection system 102 may be included in, or associated with, the email service platform. For instance, the email security detection system 102 may provide security analysis for emails communicated by the email service platform (e.g., as a secure email gateway). Furthermore, a second computing infrastructure may comprise a different domain and/or pool of resources used to host the email service platform.

The email service platform may provide one or more email services to users of user devices to enable the user devices to communicate emails. Sending devices 104 may communicate with receiving devices 106 over one or more networks 108, such as the Internet. However, the network(s) 108 may generally comprise one or more networks implemented by any viable communication technology, such as wired and/or wireless modalities and/or technologies. The network(s) 108 may include any combination of Personal Area Networks (PANs), Local Area Networks (LANs), Campus Area Networks (CANs), Metropolitan Area Networks (MANs), extranets, intranets, the Internet, short-range wireless communication networks (e.g., ZigBee, Bluetooth, etc.) Wide Area Networks (WANs)—both centralized and/or distributed—and/or any combination, permutation, and/or aggregation thereof. The network(s) 108 may include devices, virtual resources, or other nodes that relay packets from one device to another.

As illustrated, the user devices may include the sending devices 104 that send emails and the receiving devices 106 that receive the emails. The sending devices 104 and receiving devices 106 may comprise any type of electronic device capable of communicating using email communications. For instance, devices 104/106 may include one or more different personal user devices, such as desktop computers, laptop computers, phones, tablets, wearable devices, entertainment devices such as televisions, and/or any other type of computing device. Thus, the user devices 104/106 may utilize the email service platform to communicate using emails based on email address domain name systems according to techniques known in the art.

The email service platform may receive emails that are destined for the receiving device 106 that has access to inboxes associated with destination email addresses managed by or provided by the email service platform. That is, emails, including allowed emails 110, are communicated over the network(s) 108 to one or more recipient servers of the email service platform, and the email service platform determines which registered user the email is intended for based on email information such as headers and body of the email, for example, 'mail from', 'rcpt to', 'envelope from', "From" addresses (i.e., sender addresses), sender domain, displayed text, sender signature, brand names for the email, "URL" addresses contained within the email, "Reply-To Field" addresses and/or brand names of the email and the like. In instances where a user of the receiving device 106 has registered for use of the email-security system 102, an organization managing the user devices 104/106 has registered for use of the email-security system 102, and/or the email service platform itself has registered for use of the email-security system 102, the email service platform may provide the appropriate emails to the front end for pre-preprocessing of the security analysis process.

Generally, the email security detection system 102 may perform at least metadata extraction techniques on the emails and may further perform content pre-classification techniques on the emails in some instances using various natural language techniques to extract attributes of the email 112. The types of metadata that may be scanned for, and extracted by, the email security detection system 102 from an email 112 (i.e., an intercepted or in transit email on route to a recipient email address) include indications of information from SMTP commands, headers, and body of the email, for example, 'mail from', 'rcpt to', 'envelope from', "From" addresses (i.e., sender addresses), sender domain, displayed text, sender signature, brand names for the email, "URL" addresses contained within the email, "Reply-To Field" addresses and/or brand names of the email, a Date/Time the email was communicated, attachments and/or hashes of attachments to the email, URLs in the body of the email and/or associated with unsubscribe actions, and so forth. Generally, the email service platform and/or users of the email security platform may define what information is permitted to be scanned and/or extracted from the emails, and what information is too private or confidential and is not permitted to be scanned and/or extracted from the emails.

Upon extracting metadata (or "features") from the emails that are to be used for security analysis, the email security detection system 102 may perform security analysis on the email metadata using, among other techniques, security policies defined for the email security platform.

In some embodiments, the email security detection system 102 performs the analysis process 114 that includes the steps to (1) receive and/or detect an (incoming) email 112, and (2) to extract data of various email attributes such as sender domain, sender address, sender signature etc., and an analysis process 114 of (3) determine the email recipient status, (4) analyze the email 112 and detect the email context (5) apply one or more relationship models, (6) use conversational history of the email recipient that include targeted recipients and/or other recipients (i.e., including recipients that have not been targeted including past or different recipients), and (7) based on the results, determine the likelihood that the email comprises a BEC attack and (8) if the email it is deemed a BEC attack then applies an appropriate action (e.g., issue an alert 116).

Figure 2:
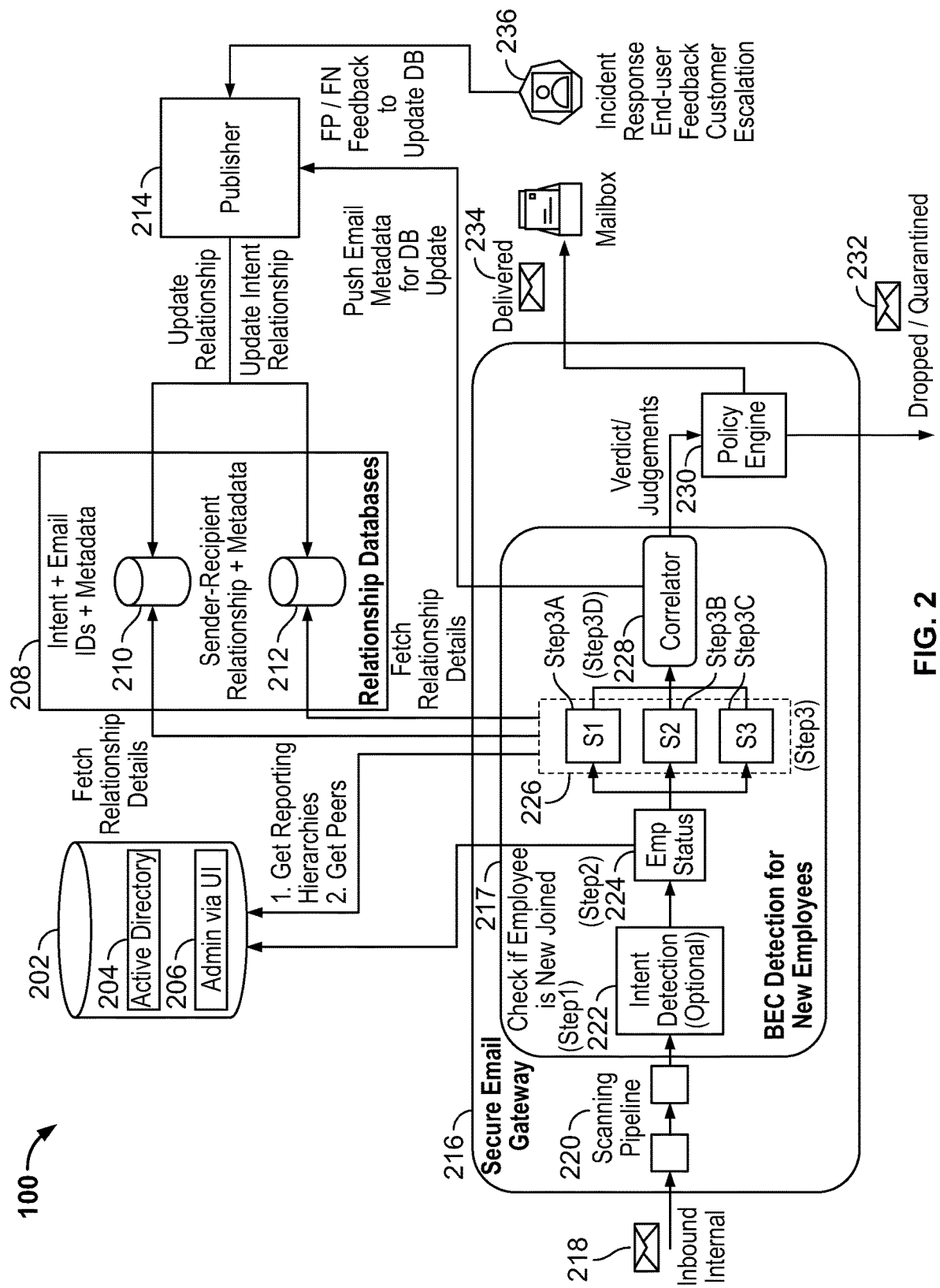
FIG. 2 illustrates a system-architecture diagram system that includes an example secure email gateway (SEG) with an email security detection system that is coupled to an employee database, relationship database, and publisher module that applies a set of relationship models (S1-S3) to determine whether an email is a BEC attack according to some embodiments.

FIG. 2 illustrates a system-architecture diagram system 200 that includes an example secure email gateway (SEG) 216 with an email security detection system 217 that is coupled to an employee database 202, relationship database 208, and publisher module 214 that applies a set of relationship models (S1-S3) to determine whether an email is a BEC attack (i.e., the email is fraudulent or not). In FIG. 2, when an email is received by the secure email gateway (SEG) 216, the inbound or incoming email 218 a scanning operation (via a scanning module 220) of the email is executed using OCR or other scanning applications. The email security detection system 217 is configured to apply a series of algorithms or intelligent models to determine among other things, the email intent, identification of new employees from the email content, and use of the email content to build a relationship model or to apply a relationship model. Next, at an intent detection module 222 one or more intent detection algorithms are applied (at Step-1) after the initial scanning of the email (scanning operation by the scanning module 220) is performed at the SEG 216. The processing pipeline next to the status module 224 determines whether or not the email is associated with a new employee. For example, the status module 224 may check (at Step-2) if the employee is a new employee by sending one or more requests to an employee database 202 to access employee information from an active employee directory 204 or input from a graphical user interface 206 via an administrator who receives requests about an employee status or adds information about the employee status.

In some embodiments, once the status of the employee has been determined, for example, whether the employee is active, a new employee, etc., then the email security detection system 217 at a multi-part module 226 is configured to execute one or more processing (modules S1-S3 of a step-3). For example, in module S1 (shown in step-3a in FIG. 4), an algorithm is configured to use the relationship model of the peers (Team members, Reporting hierarchy, etc.,) of the targeted recipient. In module S2 (shown in step-3b in FIG. 4), an algorithm may be executed to use the relationship model of other recipients in the targeted email. In module S3 (shown in step-3c in FIG. 4), the algorithm is configured to use relationship modeling based on determining intent using past conversations with similar intent of recipients.

In an embodiment, identifying the new employee may be done by configuring the email security detection system 217 to call or fetch information from an Active Directory (AD) 204 or by an administrator input via a graphical user interface 206 via the User Interface (UI) of the product. In some embodiments, if one or more of the recipients of the email is identified as a new employee, then proceeds to module S3 (shown in step-3c of FIG. 4).

At module S3 (at step-3c), the algorithm is configured to apply the last part of the multi-part model 226 (with reference to FIG. 4) of building the detection model that may include relationship modeling based on determining intent using past conversations with similar intent of recipients, determining other recipients being added during a conversational thread with similar intent in the past, and finally checking/validating of similarities of current and past intents, and relationships of recipients with the sender. In some embodiments, the multi-part model 226 applies one or more different detection algorithms based on data of intent data, email ID data, and metadata stored at a communicatively coupled database 210.

In some embodiments, the module S1 at step 3a is configured to use the relationship model of the peers (Team members, Reporting hierarchy, etc.,) of the targeted recipient. In this step, the email security detection system 217 may retrieve data from the AD/Directory Service email address such as a complete listing or framework (including tree hierarchy) of all the team members (peers, reporting hierarchy, etc.), and retrieve their relationship with each other and with the sender. Some weighting may also apply to persons with relationships like to be used in phishing emails or have more or less communications. For example, the CEO may be weighted less as this person is easily identified while an HR person may be less easy to identify in a phishing attempt.

In some embodiments, the email security detection system 217 at module S2 is configured at step 3B to use the relationship model of other recipients in the targeted email. Here, the email security detection system 217 (or SEG 216) retrieves the email addresses of all the other recipients in the email being analyzed and retrieves their relationship with the sender. The other email addresses may also be compared with a repository that is built in real-time of email addresses used in phishing emails etc.

In some embodiments, the email security detection system 217 at module S3 at step 3C is configured to use the conversation history and recipients in the original thread which has been added/removed before a similar intent was serviced. Here, the email security detection system 217 may be configured to retrieve email metadata of past conversations from the sender with the same/similar intents and retrieves the list of users (email address) that were originally present in the email conversation, users who were added/removed before the intent was serviced.

In some embodiments, the email security detection system 217 via the correlator 228 at step-3D may implement a correlation model configured at the correlator 228 that uses the data retrieved from Step-3A, Step-3B, and Step-3C to generate based on an algorithm or policy (of a policy engine 230), a final judgment or determination of an email being analyzed. For example, each of the steps may have a weighting and a final score may be generated that is indicative of the final judgment or determination.

In some embodiments, the email security detection system 217 applies one or more relationship models fetched from a relationship database 212 (remotely or locally stored 208) such as a relationship model of the peers (e.g. team members, reporting hierarchy, etc.,) of the targeted recipients, wherein the email security detection system 217 is configured to retrieve data from the AD/directory service (employee database 202 or an employee email source) of email addresses of all the team members and retrieves their relationship with each other and with the sender; the email security detection system 217 is configured to generate a weight/score to the email recipients with relationships likely to be used in phishing emails or have more or a lesser number communications interactions. Based on the relationship model of other recipients in the targeted email, the email security detection system 217 is configured to retrieve one or more email addresses of all or nearly all the other recipients in an email being analyzed and retrieve data or determine their relationship to the sender.

In some embodiments, the other email addresses may be compared with a repository that is built in real-time of email addresses used in phishing emails. In some embodiments, the email security system 217 uses the conversation history (i.e., email metadata of past conversations by correlating data from the database 210) and recipients in the original thread that are added or removed before a similar intent was serviced, generating a final score/weight/judgment for the email being analyzed. For example, past conversations with similar intent may be correlated using the intent metadata found in database 210 and the relationship data found in database 212. In some embodiments, the email security detection system 217 is configured to use a correlation model (of correlator 228) that uses the data retrieved via steps 3A-3D to generate a judgment by an algorithm that maps the data against a policy (via a policy engine 230) for taking final actions for the email such as an alert, blocking 232 of the email, or release and delivery 234 of the email.

In some embodiments, end-user feedback and/or customer escalation at 236 is provided to the publisher module 214 for updates to the database to update the relationship models and the intent relationships used in the analysis operations. In some embodiments, false positives (FPs) and false negatives (FNs) in feedback may be added to the publisher module 214 and can be used to update recipient-modeled relationships and intent-modeled relationships.

Figure 3:
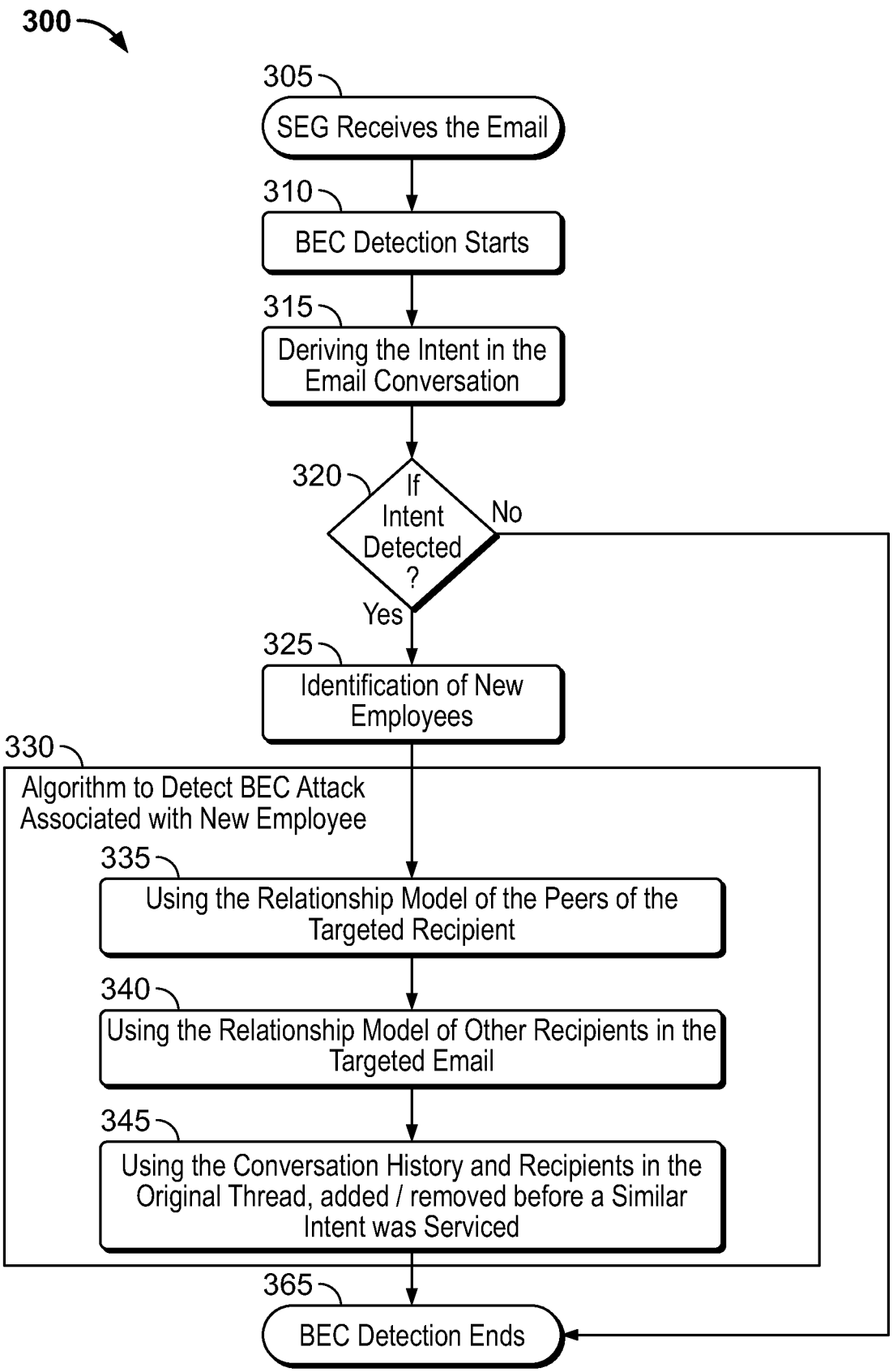
FIG. 3 illustrates a flowchart of an example method for an email-security detection system of FIG. 2 according to some embodiments.

FIG. 3 illustrates flowchart 300 of an example method for an email-security detection system 217 of FIG. 2 according to some embodiments. In FIG. 3, flowchart 300 shows various steps and operations of the email security detection system 217 to determine the intent of an incoming email, identify new employees, apply one or more relationship models of the targeted recipient or other targeted recipients, and use the conversation history of the recipients for the BEC attack detection according to some embodiments.

At step 305, the incoming email is received at the SEG 216. At step 310, the BEC detection process is initiated by the email security detection system 217 after the scanning by the scanning module 220 of the incoming email and data extraction of email content which may include metadata, recipient email addresses, sender email addresses, enterprise and brand information etc., using various data identification, extraction and NPL processes. At 315, the process for deriving the intent of email is initiated by the email security detection system 217. In some embodiments, deriving the email intent is performed by the email security detection system 217 (or the SEG 216) using one or more techniques to gateways to derive the intent of the email by analyzing the email body and attachments to determine if malicious, phishing, and/or other business compromise intent is detected. At 320, a determination is made by the email security detection system 217 whether or not an intent has been detected. For example, this determination may be made according to one or more criteria or thresholds configured with the email security detection system 217. At 325, the email security detection system 217 (or SEG 216) is configured to fetch, request, or receive data from an AD (active directory) at a database (such as a local repository, or cloud/remote repository) or via an administrator input in a product graphical user interface. A determination is made by the email security detection system 217 (or SEG) if one or more email recipients are identified or new employees; if this is the case then process flow proceeds to step 330 to apply an algorithm to determine whether or not the BEC attack is being associated or targeted to a new employee or new email recipient of the brand or enterprise. The detection process at step 330 is performed by applying one or more relationship models. At 335, a relation model is configured based on the relationships of the peers (Team members, Reporting hierarchy, etc.,) of the targeted recipient Here, the SEG retrieves from the AD/Directory Service email address of all team members (peers, reporting hierarchy, etc.) and retrieves their relationship with the sender (associated with new employees). At 340, another relationship model is configured using the relationships of other recipients in the target email. At 345, a model is configured using the conversation history and recipients in the original thread, added/removed before a similar intent was serviced. Once these steps are completed, the correlation model uses the data retrieved and generates the final judgment at 365 for the email being analyzed. The SEG uses the verdict and judgment generated by the algorithm to map against policy for taking the final action for the email.

FIG. 4 illustrates diagram 400 of details, relationships, and metadata for the steps of the email security detection system according to some embodiments. In FIG. 4, the diagram describes steps 405, with the details 410, relationship models 415, and metadata 420. In an exemplary embodiment, at Step 3A, module S1 determines the information 425 of the employees in the reporting hierarchy of the new employee, and the employees who are peers to the employee. The relationship model 430 is configured to show many employees who a related to a single sender. The metadata 420 that is realized includes relationship metadata 435 of the sender IP, sender domain, sender email address, sender IP country of origin, email authentication, recipient email address, connection information, and other relationship-related metadata. Also, the metadata 420 realizes includes intent metadata 460 of the relationship metadata 435 with intent classifications, a list of email addresses in the original email, list of email addresses added when the intent is serviced. In Step 3B, module S2 determines information 440 of other recipients with the sender in the email conversation. For example, the relationship model 445 may be configured to show other recipients who are related to a single sender. The metadata 420 realized is the relationship metadata 435 and the intent metadata 460. Step 3C, of module S3 determines the information 450 of past conversations with similar intent, other recipients added during the conversation with similar intent in the past. The module S3 may be configured to perform actions 455 of (a) to check if the current intent is similar to any of the past intent, if this is the case, then it validates if the recipients in the current conversation are the same as recipients in past conversations of a similar intent, and (b) check the relationship of the recipients with the sender. The relationship model 465 is configured to a single sender to many recipients, and many recipients to a single or same intent. The metadata 420 realized is the relationship metadata 435 and the intent metadata 460.

Figure 5:
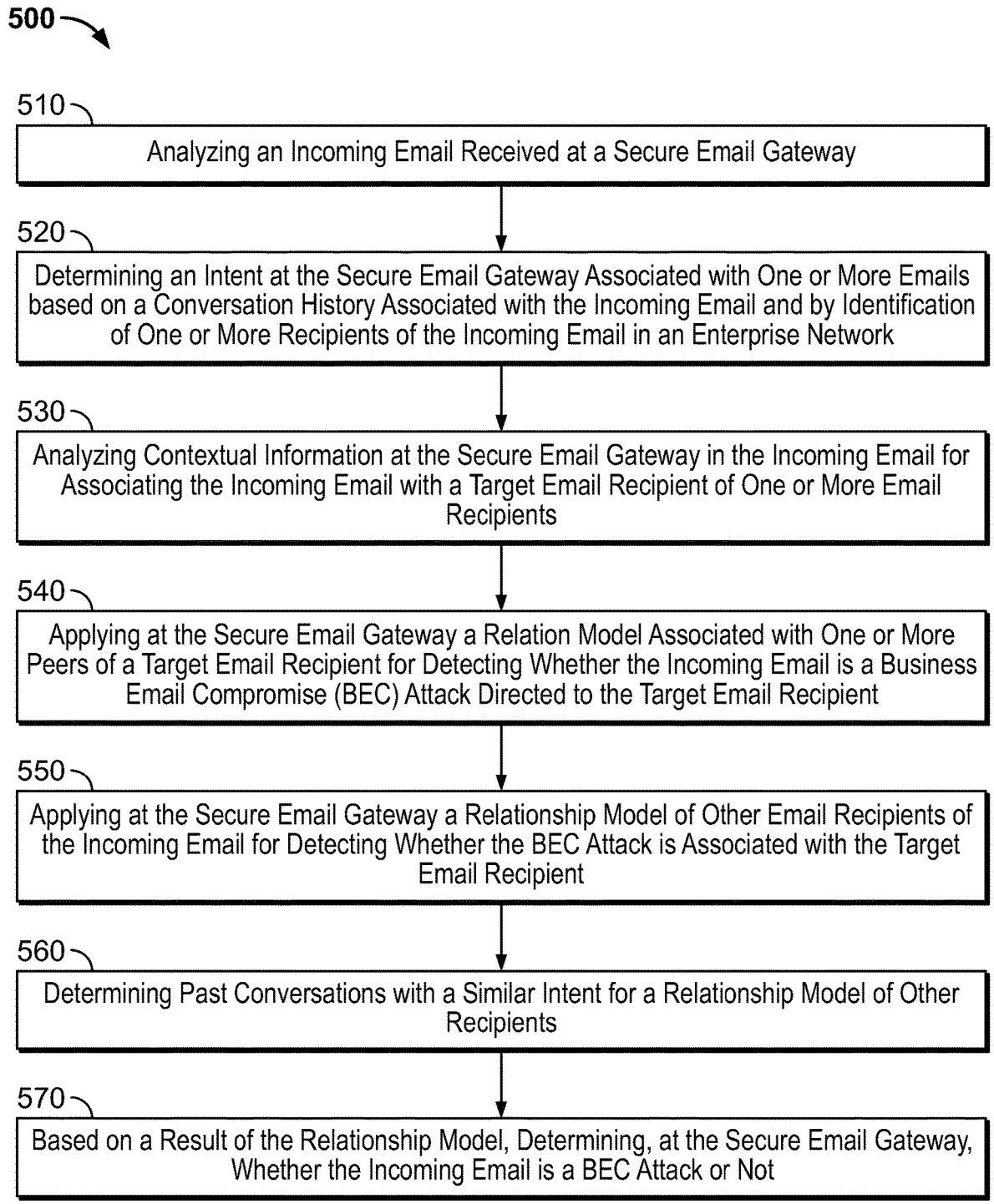
FIG. 5 illustrates a flow diagram of an example method that illustrates aspects of the functions performed at least partly by the devices in the computing infrastructures as described in FIGS. 1-2 according to some embodiments.

FIG. 5 illustrates a flow diagram of an example method 500 that illustrates aspects of the functions performed at least partly by the devices in the computing infrastructures as described in FIGS. 1-2. The logical operations described herein with respect to FIG. 5 may be implemented (1) as a sequence of computer-implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special-purpose digital logic, and any combination thereof. It should also be appreciated that more or fewer operations might be performed than shown in FIG. 5 and described herein. These operations can also be performed in parallel, or a different order than those described herein. Some or all of these operations can also be performed by components other than those specifically identified. Although the techniques described in this disclosure with reference to specific components, in other examples, the techniques may be implemented by fewer components, more components, and/or different components.

FIG. 5 illustrates a flow diagram of an example method for an email security detection system 102 to screen emails, analyze their contents, and apply a relationship model with the past conversation history of recipients with a similar or same intent to determine whether the incoming email is a BEC attack. The techniques may be applied by a system comprising one or more processors, and one or more non-transitory computer-readable media storing computer-executable instructions that, when executed by one or more processors, cause one or more processors to perform operations of method 500.

At 510, an email security detection system 102 may receive an email sent from a sending email address (i.e., sending device) and to a targeted email address (i.e., receiving device). For instance, the email security detection system 102 may monitor emails communicated by an email service platform and obtain the email. The email security detection system 102 may classify email 110 as a screened email 112. For example, the processor(s) may classify incoming emails 110 as screened and initiate a process of analyzing them as to whether one or more emails form a BEC attack.

At 520, the email security detection system 102 may extract information from the screened email 112. Based on the extracted information, the email security detection system 102 may determine intent at the secure email gateway associated with one or more emails based on a conversation history associated with the incoming email and by identification of one or more recipients of the incoming email in an enterprise network.

At 530, the email security detection system 102 may analyze contextual information at the secure email gateway in the incoming email for associating the incoming email with a target recipient of one or more recipients.

At 540, the email security detection system 102 may apply at the secure email gateway a relational model associated with one or more peers of the target recipient for detecting whether the incoming email is a business email compromise (BEC) attack directed to the target recipient.

At 550, the email security detection system 102 may apply at the secure email gateway a relationship model of other recipients of the incoming email for detecting whether the BEC attack is associated with the target recipient. based on a result of the relationship model, determining, at the secure email gateway, whether the incoming email is a BEC attack or not.

At 560, the email security detection system 102 may determine a relationship model of other recipients based on past conversations with a similar intent. Also, it may be determined whether or not other recipients have been added to the current conversation at present that are from past conversations with similar intent that occurred.

At 570, the email security detection system 102 may allow, based at least in part on a non-fraudulent classification, the screened email 112 to pass the email security detection system 102 as an allowed email 110. As such, the allowed email 110 may be allowed to pass between the sending device(s) 104 and the receiving device(s) 106, along the network(s) 108, freely.

Figure 6:
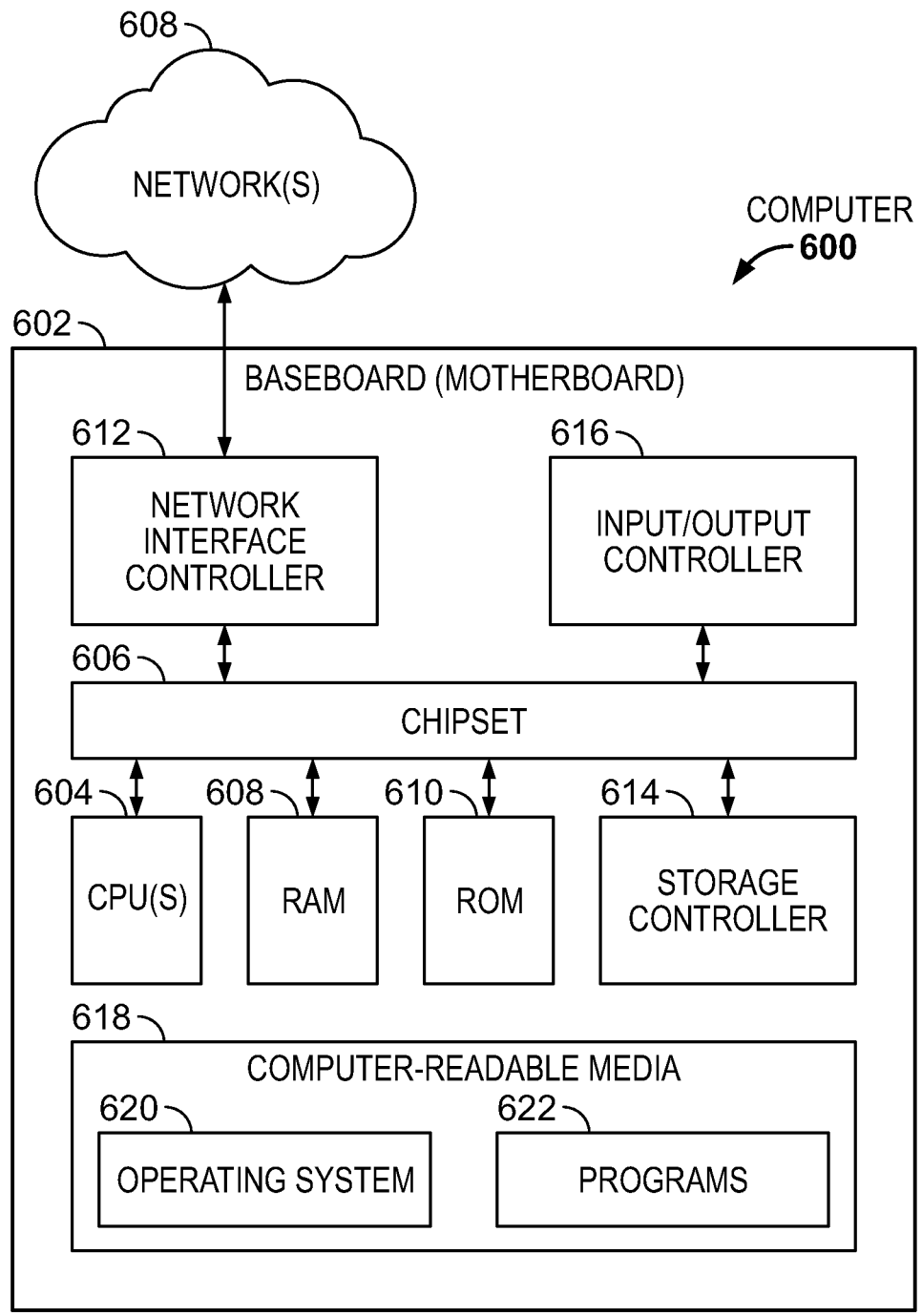
FIG. 6 is a computer architecture diagram showing an illustrative computer hardware architecture for implementing a computing device that can be utilized to implement aspects of the various technologies presented herein.

FIG. 6 shows an example of computer architecture for a computer 600 capable of executing program components for implementing the functionality described above. The computer architecture shown in FIG. 6 illustrates a conventional server computer, workstation, desktop computer, laptop, tablet, network appliance, e-reader, smartphone, or other computing device, and can be utilized to execute any of the software components presented herein. The Computer 600 may, in some examples, correspond to a physical server that is included in the email security detection system 102 described herein, and may comprise networked devices such as servers, switches, routers, hubs, bridges, gateways, modems, repeaters, access points, etc.

The Computer 600 includes a baseboard 602, or "motherboard," which is a printed circuit board to which a multitude of components or devices can be connected by way of a system bus or other electrical communication paths. In one illustrative configuration, one or more central processing units ("CPUs") 604 operate in conjunction with a chipset 606. The CPU 604 can be a standard programmable processor that performs arithmetic and logical operations necessary for the operation of the Computer 600.

The CPUs 604 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 606 provides an interface between the CPU 604 and the remainder of the components and devices on the baseboard 602. The chipset 606 can provide an interface to a RAM 608, used as the main memory in the computer 600. The chipset 606 can further provide an interface to a computer-readable storage medium such as read-only memory ("ROM") 610 or non-volatile RAM ("NVRAM") for storing basic routines that help to startup the computer 600 and to transfer information between the various components and devices. The ROM 610 or NVRAM can also store other software components necessary for the operation of the Computer 600 in accordance with the configurations described herein.

The Computer 600 can operate in a networked environment using logical connections to remote computing devices and computer systems through a network, such as Network 108. The chipset 606 can include functionality for providing network connectivity through a NIC 612, such as a gigabit Ethernet adapter. The NIC 612 is capable of connecting the Computer 600 to other computing devices over network 108. It should be appreciated that multiple NICs 612 can be present in computer 600, connecting the computer to other types of networks and remote computer systems.

The Computer 600 can be connected to a storage device 618 that provides non-volatile storage for the computer. The storage device 618 can store an operating system 620, programs 622, and data, which have been described in greater detail herein. The storage device 618 can be connected to the computer 600 through a storage controller 614 connected to the chipset 606. The storage device 618 can consist of one or more physical storage units. The storage controller 614 can interface with the physical storage units through a serial attached SCSI ("SAS") interface, a serial advanced technology attachment ("SATA") interface, a fiber channel ("FC") interface, or other types of interface for physically connecting and transferring data between computers and physical storage units.

The Computer 600 can store data on the storage device 618 by transforming the physical state of the physical storage units to reflect the information being stored. The specific transformation of the physical state can depend on various factors, in different embodiments of this description. Examples of such factors can include but are not limited to, the technology used to implement the physical storage units, whether the storage device 618 is characterized as primary or secondary storage, and the like.

For example, computer 600 can store information to the storage device 618 by issuing instructions through the storage controller 614 to alter the magnetic characteristics of a particular location within a magnetic disk drive unit, the reflective or refractive characteristics of a particular location in an optical storage unit, or the electrical characteristics of a particular capacitor, transistor, or other discrete components in a solid-state storage unit. Other transformations of physical media are possible without departing from the scope and spirit of the present description, with the foregoing examples provided only to facilitate this description. The Computer 600 can further read information from storage device 618 by detecting the physical states or characteristics of one or more locations within the physical storage units.

In addition to the mass storage device 618 described above, the computer 600 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 600. In some examples, the operations performed by devices in a distributed application architecture, and or any components included therein, may be supported by one or more devices similar to Computer 600. Stated otherwise, some or all of the operations performed by the email-security system 102, and or any components included therein, may be performed by one or more computers 600 (i.e., computer devices) operating in any system or arrangement.

By way of example, and not limitation, computer-readable storage media can include volatile and non-volatile, removable, and non-removable media implemented in any method or technology. Computer-readable storage media includes but is not limited to, RAM, ROM, erasable programmable ROM ("EPROM"), electrically-erasable programmable ROM ("EEPROM"), flash memory, or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 618 can store an operating system 620 utilized to control the operation of the computer 600. According to one embodiment, the operating system comprises the LINUX operating system. According to another embodiment, the operating system comprises the WINDOWS® SERVER operating system from MICROSOFT® Corporation of Redmond, Washington. According to further embodiments, the operating system can comprise the UNIX operating system or one of its variants. It should be appreciated that other operating systems can also be utilized. The storage device 618 can store other system or application programs and data utilized by the computer 600.

In one embodiment, the storage device 618 or other computer-readable storage media is encoded with computer-executable instructions which, when loaded into the computer 600, transform the computer from a general-purpose computing system into a special-purpose computer capable of implementing the embodiments described herein. These computer-executable instructions transform the computer 600 by specifying how the CPUs 604 transition between states, as described above. According to one embodiment, the computer 600 has access to computer-readable storage media storing computer-executable instructions which, when executed by the computer 600, perform the various processes described above with regard to FIGS. 1-5. The Computer 600 can also include computer-readable storage media having instructions stored thereupon for performing any of the other computer-implemented operations described herein.

The computer 600 can also include one or more input/output controllers 616 for receiving and processing input from a number of input devices, such as a keyboard, a mouse, a touchpad, a touch screen, an electronic stylus, or other types of input devices. Similarly, an input/output controller 616 can provide output to a display, such as a computer monitor, a flat-panel display, a digital projector, a printer, or other type of output device. It will be appreciated that the computer 600 might not include all of the components shown in FIG. 6, can include other components that are not explicitly shown in FIG. 6, or might utilize an architecture completely different than that shown in FIG. 6.

Clause 1. A method comprising: analyzing an incoming email received at a secure email gateway; determining an intent at the secure email gateway associated with one or more emails based on a conversation history associated with the incoming email and by identification of one or more recipients of the incoming email in an enterprise network; analyzing contextual information at the secure email gateway in the incoming email for associating the incoming email with a target recipient of one or more email recipients; applying, at the secure email gateway, a relational model associated with one or more peers of a target recipient for detecting whether the incoming email is a business email compromise (BEC) attack directed to the target recipient; applying, at the secure email gateway, a relationship model of other email recipients of the incoming email for detecting whether the BEC attack is associated with the target recipient; and based on a result of the relationship model, determining, at the secure email gateway, whether the incoming email is a BEC attack or not.

Clause 2. The method of clause 1, further comprising: applying a relationship model of other email recipients based on determining of conversation between other recipients in the enterprise network comprising a similar intent.

Clause 3. The method of clause 1, wherein the target recipient comprises at least one of a new employee email within the enterprise network or a lateral employee email from a different entity within the enterprise network.

Clause 4. The method of clause 1, further comprising: requesting information at the secure email gateway of the target recipient in the enterprise network to determine whether a target recipient is at least one of a new email recipient of the enterprise network or a lateral email recipient from a different entity within the enterprise network.

Clause 5. The method of clause 1, further comprising: determining, at the secure email gateway, a relationship model based on one or more past conversations comprising a similar intent that includes one or more other recipients within the enterprise network.

Clause 6. The method of clause 1, wherein the BEC attack comprises phishing and unauthorized access attempts to solicit information from employees; and wherein the incoming email comprises at least one of an external-to-internal incoming email or an internal-to-internal incoming email.

Clause 7. The method of clause 1, wherein determining comprises determining a BEC attack that targets one or more vulnerabilities common to at least one of new employees or lateral employees of other entities of the enterprise network, based on at least one of a lack of organizational knowledge or business email practices of the enterprise network.

Clause 8. A system comprising: one or more processors; and one or more non-transitory computer-readable media storing computer-executable instructions that, when executed by the one or more processors, cause the one or more processors to perform operations comprising: analyzing an incoming email received at a secure email gateway; determining an intent at the secure email gateway associated with one or more emails of an email conversation associated with the incoming email and identifying one or more recipients of the incoming email in an enterprise network; analyzing contextual information at the secure email gateway in the incoming email for associating the incoming email with a target recipient of the one or more recipients; applying, at the secure email gateway, a relational model associated with one or more peers of the target recipient for detecting whether the incoming email is a business email compromise (BEC) attack directed to the target recipient; applying at the secure email gateway a relationship model of other recipients of the incoming email for detecting whether the BEC attack is associated with the target recipient; and determining, whether the incoming email is a BEC attack to solicit information from the target recipient.

Clause 9. The system of clause 8, further comprising: applying, at the secure email gateway, a relationship model of one or more other email recipients based on determining of a conversation between one or more other recipients in the enterprise network comprising a similar intent.

Clause 10. The system of clause 8, wherein the target recipient comprises at least one of a new employee email within the enterprise network or a lateral employee from a different entity within the enterprise network.

Clause 11. The system of clause 8, wherein the one or more processors are configured to perform operations further comprising: requesting information at the secure email gateway of the target recipient in the enterprise network to determine whether the target recipient is at least one of a new email recipient of the enterprise network, or a lateral email recipient from a different entity within the enterprise network.

Clause 12. The system of clause 11, further comprising: using a past conversation and other recipients added before a similar intent has been serviced.

Clause 13. The system of clause 8, wherein the BEC attack comprises phishing and unauthorized access attempts to solicit information from employees; and wherein the incoming email comprises at least one of an external-to-internal incoming email or an internal-to-internal incoming email.

Clause 14. The system of clause 8, wherein determining comprises determining a BEC attack that targets one or more vulnerabilities common to new employees based on at least one of a lack of organizational knowledge or business email practices of the enterprise network.

Clause 15. One or more non-transitory computer-readable media storing computer-executable instructions that, when executed by one or more processors, cause the one or more processors to perform operations comprising: analyzing an incoming email received at a secure email gateway; determining an intent at the secure email gateway associated with one or more emails of an email conversation associated with the incoming email and identifying one or more recipients of the incoming email in an enterprise network; analyzing contextual information at the secure email gateway in the incoming email for associating the incoming email with a target recipient of the one or more recipients; applying at the secure email gateway a relational model associated with one or more peers of the target recipient for detecting whether the incoming email is a business email compromise (BEC) attack directed to the target recipient; applying at the secure email gateway a relationship model of other recipients of the incoming email for detecting whether the BEC attack is associated with the target recipient; and determining, whether the incoming email is a BEC attack to solicit information from the target recipient.

Clause 16. The one or more non-transitory computer-readable media of clause 15, wherein the target recipient is at least one of a new email recipient of the enterprise network, or a lateral employee email recipient from a different entity within the enterprise network, and wherein the incoming email comprises at least one of an external-to-internal incoming email or an internal-to-internal incoming email.

Clause 17. The one or more non-transitory computer-readable media of clause 15, wherein the target recipient is at least one of a new employee of an entity associated with an enterprise network or a lateral employee from other entities within the enterprise network.

Clause 18. The one or more non-transitory computer-readable media of clause 15, cause the one or more processors to perform further operations comprising: requesting information at the secure email gateway of the targeted recipient in the enterprise network to determine whether the target recipient is at least one of a new email recipient of the enterprise network or a lateral employee from other entities within the enterprise network.

Clause 19. The one or more non-transitory computer-readable media of clause 18, wherein determining based on a past conversation of one or more other email recipients.

Clause 20. The one or more non-transitory computer-readable media of clause 15, wherein the determining comprises determining a BEC attack that targets one or more vulnerabilities common to at least one of new employees or lateral employees of other entities of the enterprise network, based on a lack of organizational knowledge and business email practices of the enterprise network.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure and covers all changes and modifications that do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative of some embodiments that fall within the scope of the claims of the application.

What is claimed is:

1. A method comprising:
analyzing an incoming email received at a secure email gateway;
determining an intent at the secure email gateway associated with one or more emails based on a conversation history associated with the incoming email and by identification of one or more recipients of the incoming email in an enterprise network;
analyzing contextual information at the secure email gateway in the incoming email for associating the incoming email with a target recipient of one or more email recipients;
applying, at the secure email gateway, a first model associated with one or more peers of a target recipient wherein the first model defines a relationship of a group or hierarchy to the target recipient in the enterprise network to detect whether the incoming email is a business email compromise (BEC) attack directed to the target recipient;
applying, at the secure email gateway, a second model wherein the second model defines the relationship discovered in communications to email recipients to detect whether the BEC attack is directed to the target recipient;
applying, at the secure email gateway, a third model wherein the third model defines the relationship of a past intent based on content of the incoming email to detect whether the BEC is directed to the target recipient; and
based on a result of the first model, second model, and third model determining, at the secure email gateway, whether the incoming email is a BEC attack or not.

2. The method of claim 1, further comprising:
applying a fourth model of the relationship of email recipients based on determining of a conversation between recipients in the enterprise network comprising a similar intent.

3. The method of claim 1, wherein the target recipient comprises at least one of a new employee email within the enterprise network or a lateral employee email from a different entity within the enterprise network.

4. The method of claim 1, further comprising:
requesting information at the secure email gateway of the target recipient in the enterprise network to determine whether a target recipient is at least one of a new email recipient of the enterprise network or a lateral email recipient from a different entity within the enterprise network.

5. The method of claim 1, further comprising:
determining, at the secure email gateway, a fifth model of the relationship between one or more recipients based on one or more past conversations comprising a similar intent that includes one or more recipients within the enterprise network.

6. The method of claim 1, wherein the BEC attack comprises phishing and unauthorized access attempts to solicit information from employees; and wherein the incoming email comprises at least one of an external-to-internal incoming email or an internal-to-internal incoming email.

7. The method of claim 1, wherein determining comprises determining a BEC attack that targets one or more vulnerabilities common to at least one of new employees or lateral employees of other entities of the enterprise network, based on at least one of a lack of organizational knowledge or business email practices of the enterprise network.

8. A system comprising:
one or more processors; and
one or more non-transitory computer-readable media storing computer-executable instructions that, when executed by the one or more processors, cause the one or more processors to perform operations comprising:
analyzing an incoming email received at a secure email gateway;
determining an intent at the secure email gateway associated with one or more emails of an email conversation associated with the incoming email and identifying one or more recipients of the incoming email in an enterprise network;
analyzing contextual information at the secure email gateway in the incoming email for associating the incoming email with a target recipient of the one or more recipients;
applying, at the secure email gateway, a first model associated with one or more peers of the target recipient wherein the first model defines a relationship of a group or hierarchy to the target recipient in the enterprise network to detect whether the incoming email is a business email compromise (BEC) attack directed to the target recipient;
applying, at the secure email gateway, a second model wherein the second model defines the relationship discovered in communications to email recipients to detect whether the BEC attack is associated with the target recipient;
applying, at the secure email gateway, a third model wherein the third model defines the relationship of a past intent based on content of the incoming email to detect whether the BEC is directed to the target recipient; and
determining, whether the incoming email is a BEC attack based on a result from the first model, the second model, and the third model to solicit information from the target recipient.

9. The system of claim 8, further comprising:
applying, at the secure email gateway, a fourth model of the relationship of one or more other email recipients based on determining of the email conversation between one or more recipients in the enterprise network comprising a similar intent.

10. The system of claim 8, wherein the target recipient comprises at least one of a new employee email within the enterprise network or a lateral employee from a different entity within the enterprise network.

11. The system of claim 8, wherein the one or more processors are configured to perform operations further comprising:
requesting information at the secure email gateway of the target recipient in the enterprise network to determine whether the target recipient is at least one of a new email recipient of the enterprise network or a lateral email recipient from a different entity within the enterprise network.

12. The system of claim 11, further comprising:
using a past email conversation and other recipient added before a similar intent has been serviced.

13. The system of claim 8, wherein the BEC attack comprises phishing and unauthorized access attempts to solicit information from employees; and wherein the incoming email comprises at least one of an external-to-internal incoming email or an internal-to-internal incoming email.

14. The system of claim 8, wherein determining comprises determining a BEC attack that targets one or more vulnerabilities common to new employees based on at least one of a lack of organizational knowledge or business email practices of the enterprise network.

15. One or more non-transitory computer-readable media storing computer-executable instructions that, when executed by one or more processors, cause the one or more processors to perform operations comprising:
analyzing an incoming email received at a secure email gateway;
determining an intent at the secure email gateway associated with one or more emails of an email conversation associated with the incoming email and identifying one or more recipients of the incoming email in an enterprise network;
analyzing contextual information at the secure email gateway in the incoming email for associating the incoming email with a target recipient of the one or more recipients;
applying at the secure email gateway a first model associated with one or more peers of the target recipient wherein the first model defines a relationship of a group or hierarchy to the target recipient in the enterprise network to detect whether the incoming email is a business email compromise (BEC) attack directed to the target recipient;
applying at the secure email gateway a second model wherein the second model defines the relationship discovered in communications to email recipients to detect whether the BEC attack is associated with the target recipient;
applying, at the secure email gateway, a third model wherein the third model defines the relationship of a past intent based on content of the incoming email to detect whether the BEC is directed to the target recipient; and
determining, whether the incoming email is a BEC attack based on a result from the first model, the second model, and the third model to solicit information from the target recipient.

16. The one or more non-transitory computer-readable media of claim 15, wherein the target recipient is at least one of a new email recipient of the enterprise network or a lateral employee email recipient from a different entity within the enterprise network, and wherein the incoming email comprises at least one of an external-to-internal incoming email or an internal-to-internal incoming email.

17. The one or more non-transitory computer-readable media of claim 15, wherein the target recipient is at least one of a new employee of an entity associated with an enterprise network or a lateral employee from other entities within the enterprise network.

18. The one or more non-transitory computer-readable media of claim 15, cause the one or more processors to perform further operations comprising:
requesting information at the secure email gateway of the target recipient in the enterprise network to determine whether the target recipient is at least one of a new email recipient of the enterprise network or a lateral employee from other entities within the enterprise network.

19. The one or more non-transitory computer-readable media of claim 18, wherein determining based on a past email conversation of one or more other email recipients.

20. The one or more non-transitory computer-readable media of claim 15, wherein the determining comprises determining a BEC attack that targets one or more vulnerabilities common to at least one of new employees or lateral employees of other entities of the enterprise network, based on a lack of organizational knowledge and business email practices of the enterprise network.

* * * * *